Jan. 26, 1971 H. MARDER 3,559,024
MOTOR REVERSING AND STOPPING AT LIMIT OF TRAVEL
AND NUMBER OF REVOLUTIONS
Filed April 4, 1969 5 Sheets-Sheet 1
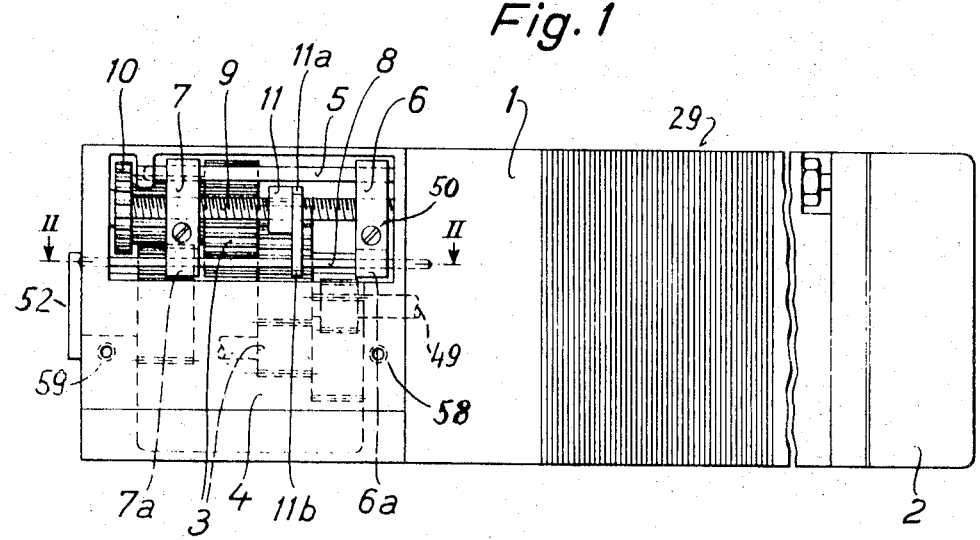
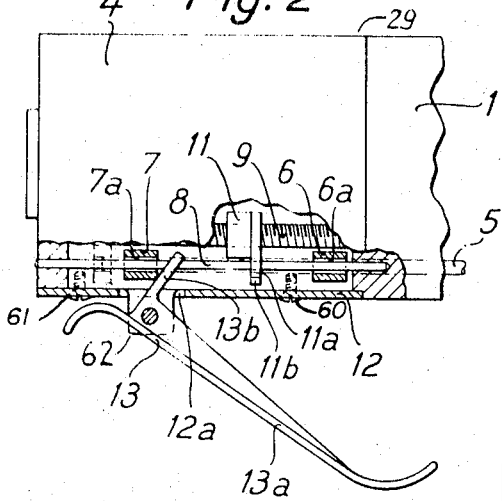
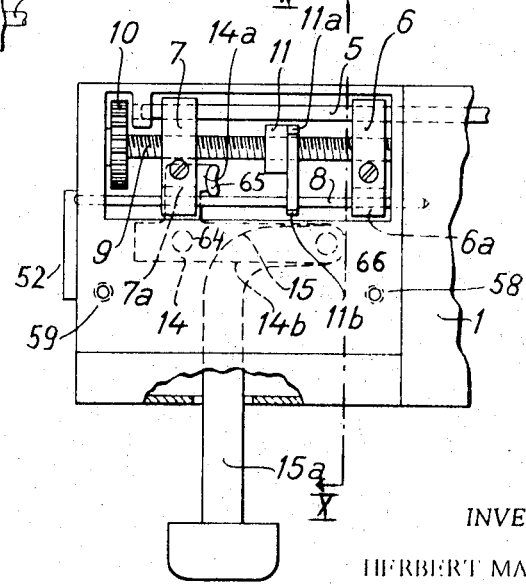
INVENTOR
HERBERT MARDER
BY *[signature]*
ATTORNEY

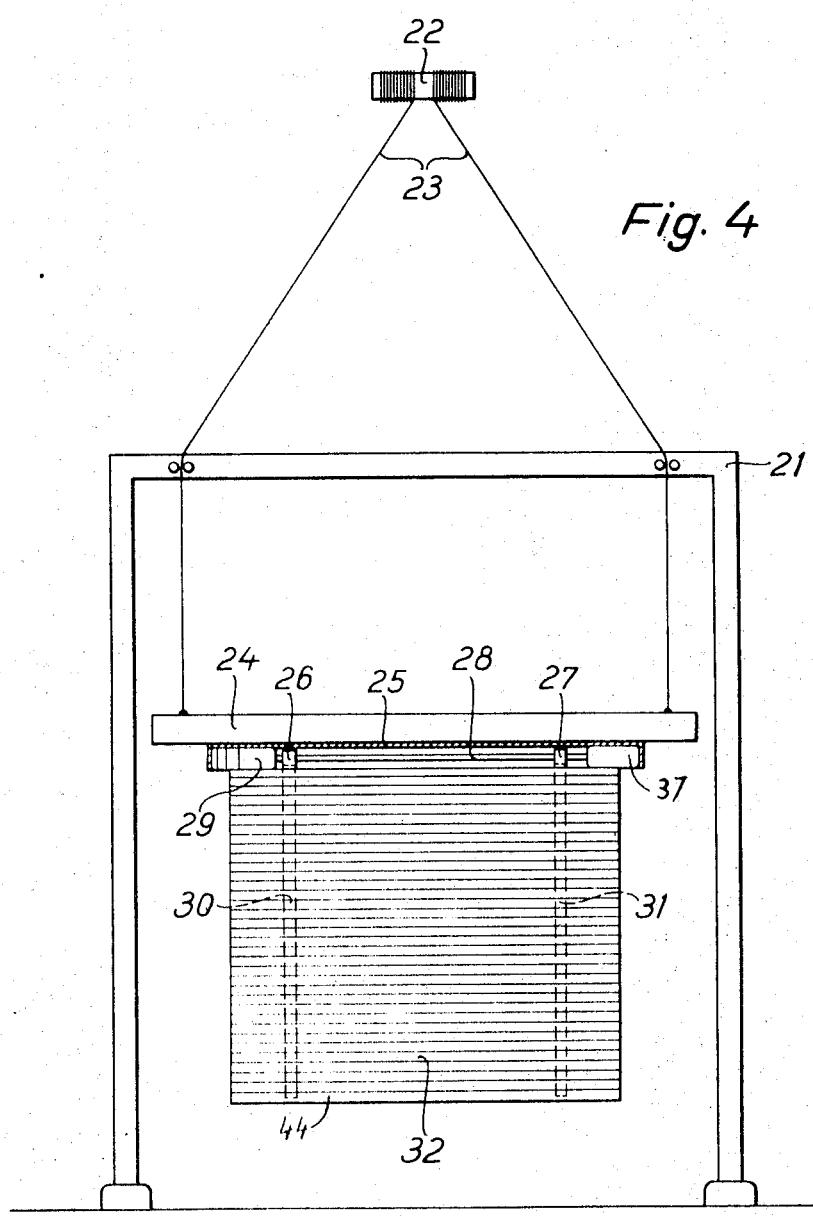

United States Patent Office 3,559,024
Patented Jan. 26, 1971

3,559,024
MOTOR REVERSING AND STOPPING AT LIMIT OF TRAVEL AND NUMBER OF REVOLUTIONS
Herbert Marder, Lenzkirch, Germany, assignor to Dunkermotoren Prazisions-Kleinstmotoren-Gesellschaft m.b.H., Bonndorf, Black Forest, Germany
Continuation-in-part of application Ser. No. 515,638, Dec. 22, 1965. This application Apr. 4, 1969, Ser. No. 813,624
Int. Cl. H02p 3/02
U.S. Cl. 318—467
5 Claims

ABSTRACT OF THE DISCLOSURE

This electromotive drive is suitable for mounting at the top of a window to provide power for automatic raising and lowering of a Venetian blind. The transmission of the drive rotates a screw on which is mounted a nut. This nut operates a switching rod to shut off an electric motor when the nut has reached either end of its range of travel. Linkage means are also supplied externally protruding from the housing of the drive. Should the Venetian blind be raised before the nut shuts off the motor, the rail of the blind forces its slats against the linkage means which in turn operates the switching rod to sut off the motor earlier than would be achieved by the nut.

CROSS-REFERENCES TO RELATED APPLICATIONS

This is a continuation-in-part application to copending U.S. parent application Ser. No. 515,638, filed Dec. 22, 1965, for an "Electromotive Drive," and the priority dates to which the parent application is entitled are claimed for all subject matter common therewith.

FIELD OF THE INVENTION

The invention relates to an electromotive drive which is suitable for example for raising and lowering Venetian blinds.

SUMMARY OF THE INVENTION

In driving a device between two positions with an electric motor, there is in certain instances great danger of damaging the motor by over-heating, if motor activation and cut-off are controlled as a function of the number of motor revolutions. For example, the device may be driven up against a stop, before the motor is cut off from its electrical power supply. Then, although it appears that the motor is off, it is actually still under power. The resultant heating may lead to a burning of the motor.

In order to avoid this possibility of motor burn-out in the case of driving devices such as Venetian blinds, an electromotive drive means is provided with motor activation and cut-off controlled both by the sum of motor revolutions and by the actual position of the device. When the device approaches too close to the drive means, it physically contacts a member which acts on the control operated by the sum of revolutions to cut off the power supply earlier than would have been achieved by sensing only the sum of motor revolutions.

Other objects and many of the attendant advantages of this invention will be readily appreciated as the same becomes better understood by reference to the following detailed description when considered in connection with the accompanying drawings in which like reference numerals designate like parts throughout the figures thereof.

BRIEF DESCRIPTION OF THE DRAWING

FIG. 1 is a bottom view of the electromotive drive means of the invention.

FIG. 2 is a partial section taken along the line II—II of FIG. 1.

FIG. 3 is a bottom view of part of the electromotive drive means of FIG. 1 and contains parts in addition to those shown in FIG. 1.

FIG. 4 is an elevation of a Venetian blind containing the electromotive means of the invention, the blind being suspended on an assembly frame.

DESCRIPTION OF THE PREFERRED EMBODIMENTS

Figure 5:
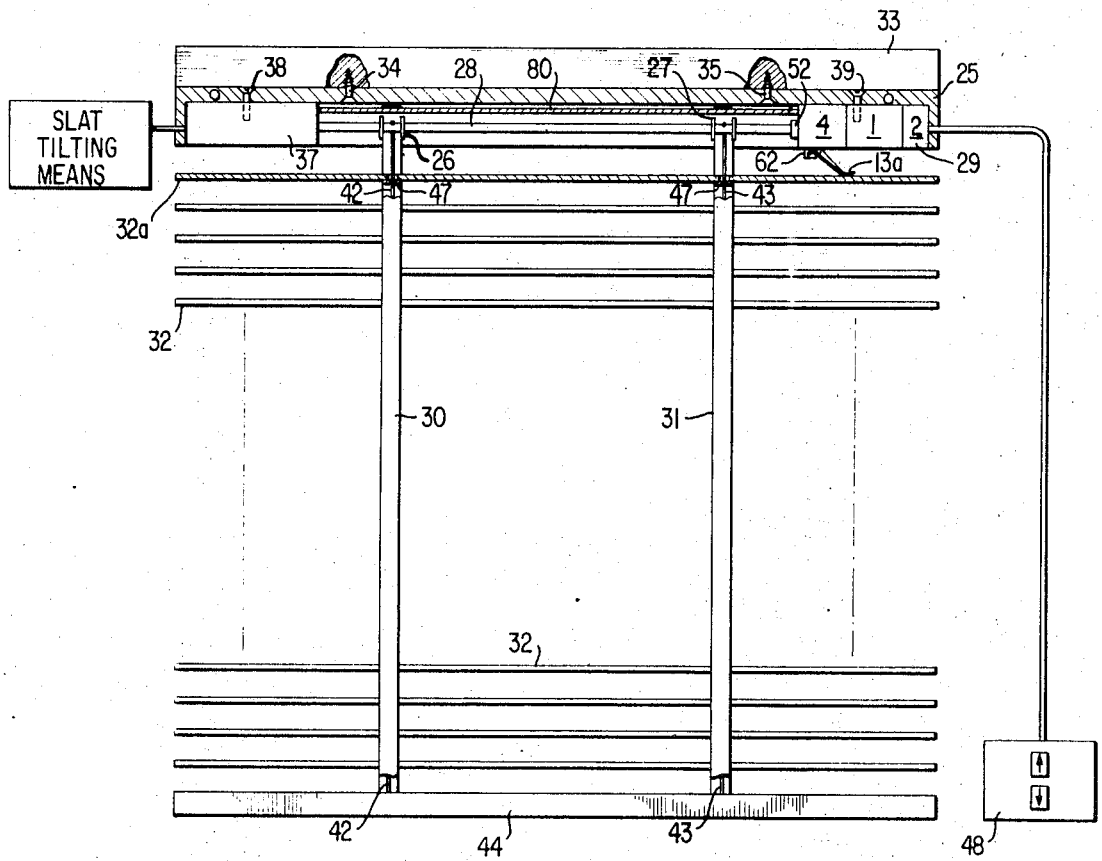
FIG. 5 is an elevation of a Venetian blind mounted in a window frame and associated with the electromotive drive means of the invention.

The electromotive drive means shown in the figures for the purpose of illustrating the invention is adapted to drive a Venetian blind between a lowered position, in which it extends from the top of the bottom of a window, and a raised position, in which it is held collapsed at the top of a window. FIG. 5 shows an upper, wooden member 33 of a window frame. Drive housing 25 is secured to member 33 with a plurality of wood screws 34 and 35. Secured within the drive housing 25 by metal screws 38 and 39 are bearing box 37 and the electromotive drive means 29. Turning bar 28 is driven by output 52 of the electromotive drive means and is journalled in the bearing box 37. Mounted fixedly to the turning bar for positive rotation therewith are reels 26 and 27. The turning bar has a head of hexagonal cross section, which mates in a coerresponding cavity in the output 52. The output turns at 23 r.p.m. in the embodiments described herein.

Connected fixedly and nonslideably at the cores of the reels 26 and 27 are cords 42 and 43. These cords pass loosely through holes in the centers of the slats 32, down to the rail 44, where they are fixedly connected thereto.

The slats are suspended on transverse tapes 47, which are the rungs of ladder straps 30 and 31.

A slat tilting means is also provided, but this is not shown other than by a labeled box in FIG. 5, which is intended to indicate that mechanism is present to rotate hemicylindrical bracket 80 about and independently of the turning bar 28. The upper ends of the ladder straps are connected to the bracket 80. The tilting means operates to raise the front tape while lowering the rear tape or vice versa. Suitable tilting mechanism is shown in U.S. Pat. No. 2,849,062, issued Aug. 26, 1958, to L. O. Bonsteel for a "Venetian Blind Tilting Mechanism" or in U.S. Pat. No. 2,851,098, issued Sept. 9, 1958, to H. S. Rosenbaum for a "Venetian Blind."

Figure 6:
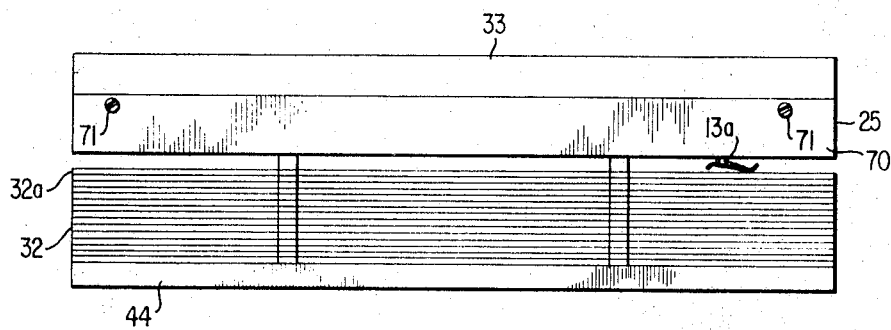
FIG. 6 is the view of FIG. 5 containing an additional housing cover and showing the blind in raised position.

Operation of the "up" button of the wall switch 48 when the blind is in the lowered position of FIG. 5 causes the electromotive drive means 29 to rotate the turning bar 28. Cords 42 and 43 are wound up on the reels 26 and 27. While the cords are being wound, rail 44 continues to raise and collects slats 32 in a stack on its upper side. In FIG. 5, lever arm 13a is pivoted downwards and rests in contact with upper slat 32a. When the rail 44 has raised sufficiently that the stack of slats includes the last slat 32a, and it raises still further, slat 32a pivots lever arm 13a counterclockwisely in FIG. 5. As will be explained hereinafter, this counterclockwise pivoting cuts off the electromotive drive means. The Venetian blind then sits in the raised position of FIG. 6, wherein it is held collapsed at the top of a window. FIG. 6 shows drive housing cover 70 held in place by two screws 71.

Referring to FIGS. 1, 2, and 7–9, the electromotive drive means 29 of the invention includes a motor housing 1 of preferably rectangular cross section. The electric motor is not shown, except for its shaft 49 extending from its housing 1. A terminal and electrical switch box 2 is provided at the right end of the housing 1 in FIG. 1. Motor shaft 49 drives a speed reduction transmission 3 at the left side of the housing 1 in FIG. 1. This transmission is contained within transmission housing 4. A linkage member or switching bar 5 extends through a bore in the periphery of housing 1 from within the transmission housing 4 into the terminal and electrical switch box 2. The bore in the housing 1 is made slightly larger than the diameter of the switching bar, so that the switching bar is slidable in its longitudinal direction. Predetermined displacements of the switching bar make and break contacts within the terminal and switch box 2, as will be explained below.

Within the transmission housing, clamps 6 and 7 are secured to the switching bar. These clamps serve as switch trip cams or triggers. Securement is accomplished using screws 50. These clamps have forked ends which fit slidably over a guide rod 8. This guide rod is fixed and extends through the interior of the transmission housing. Its function is to support the clamps during movement of the switching bar and to prevent the switching bar and the two clamps from pivoting about the axis of the switching bar.

Threaded spindle 9 is journalled in the transmission housing and carries fixedly-attached sprocket 10, which is driven by the transmission at 23 r.p.m.

A traveling nut 11 with a shoulder 11a is threadingly engaged and guided on the screw shaft or threaded spindle 9, this nut being secured against rotation by a forked lug 11b slidingly mounted on the guided rod 8. When starting the motor provided in the housing 1, the traveling nut 11 is set in motion either to the left or to the right, depending upon the direction of rotation of the motor. The nut 11 continues to travel until the shoulder 11a abuts one of the two clamps 6 and 7. Continued movement of the nut then displaces the switching bar 5, until a contact in the terminal and switching box is broken, whereby the motor, which is equipped with a slide armature brake is stopped at once. Successful stopping of the motor in this manner depends upon the accurate adjusting of the clamps 6 and 7. Such adjusting is made difficult by the fact that the feed or switching displacement of the switching bar 5 must be considered in determining the placement of the clamps.

Nut 11 has a unique spatial position for every sum of revolutions of the electric motor within the housing 1, when revolutions in one direction of rotation are counted as positive rotations and revolutions in the other direction are counted as negative rotations. This is true, since there is no slippage in the transmission 3 through to spindle 9, nor between the threading of the spindle and the threading of the nut. A considered positioning of the clamps 6 and 7 can thus operate the switch within the terminal and switch box 2 to maintain the number of revolutions of the motor within a predetermined range.

Figure 11:
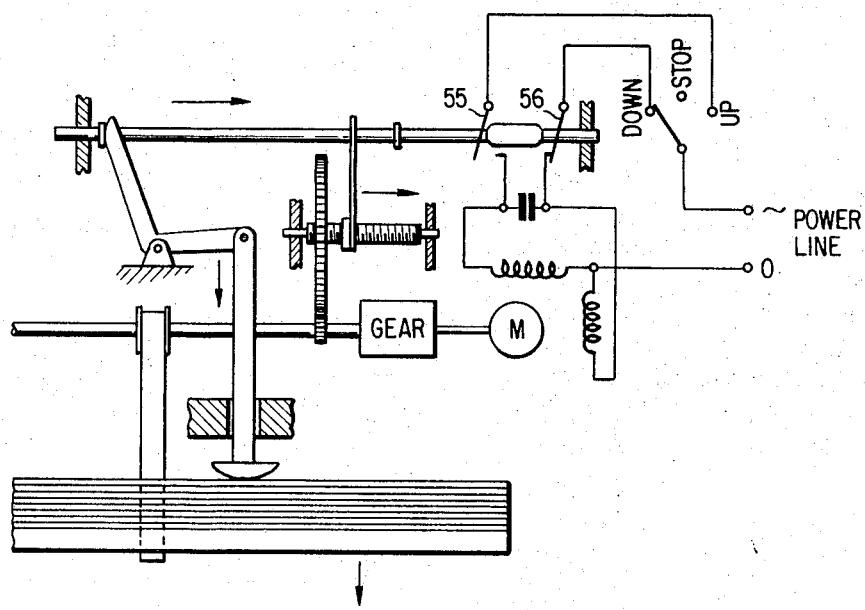
FIG. 11 is a schematic diagram illustrating the motor control circuit for the invention.
Figure 12:
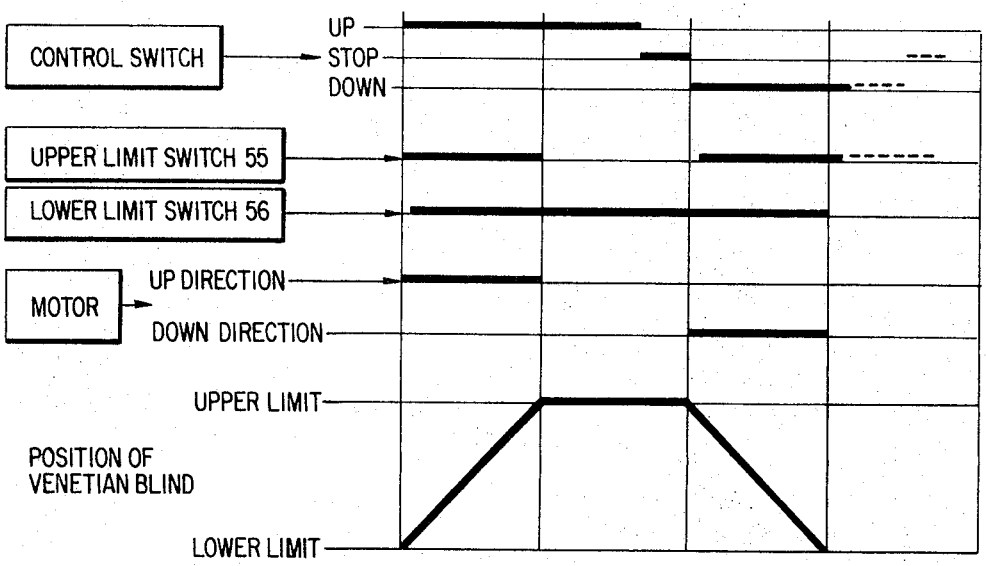
FIG. 12 is a timing diagram illustrating the interplay between various components of the invention.

FIG. 11 schematically illustrates the control system as utilized with the present invention. Switching bar 5 is journaled in the housing 1. There is no mechanical action by reversible motor 100 on the switching bar at points within the housing 1.

Actuation of the switching bar is achieved as explained above, by a pushing of the shoulder 11a on either of the clamps 6 or 7. Ordinarily, there is no contact between the shoulder and either clamp. The switching bar 5 is biased into a central position by leaf spring 57 attached to the housing at one end and perpendicularly extending to the bar 5 for connection thereto.

Power is supplied to the motor control circuit at the power line terminals. If the wall switch 48 has been pushed downwards, contacts 92 and 98 are closed. The motor then causes bar 28 (FIG. 5), which is connected to the transmission output 52, to rotate thereby lowering the venetian blinds. While the blind is lowering, nut 11 is traveling on the threaded spindle 9. By presetting the nut on the spindle, when the blind is lowered, shoulder 11a engages clamp 6 and thereby pushes the switching bar 5 to the right in FIG. 11. This causes cam 53 on switching bar 5 to push against the movable contact of switch 56 and open it thereby terminating motor operation.

If the blinds are to be raised, wall switch 48 is pushed up. This closes contacts 92 and 94. The motor 100 immediately starts running. Shoulder 11a is backed off from clamp 6 and is moved by nut 11 toward clamp 7. When shoulder 11a has left clamp 6, switching bar 5 is back in its central position due to spring 57. However, shoulder 11a never actually engages clamp 7 to push bar 5 to the left. This is done by another trigger actuator schematically indicated by 93 which is described hereinafter. Suffice it to say that the actuator 93 detects movement of top slat 32a when the slats are fully raised. Upon detection, the actuator pushes clamp 7 to the left thereby causing linked movement of bar 5 to the left. As a result, cam 53 engages the movable contact of switch 55 and opens the switch thereby terminating motor operation.

Figure 7:
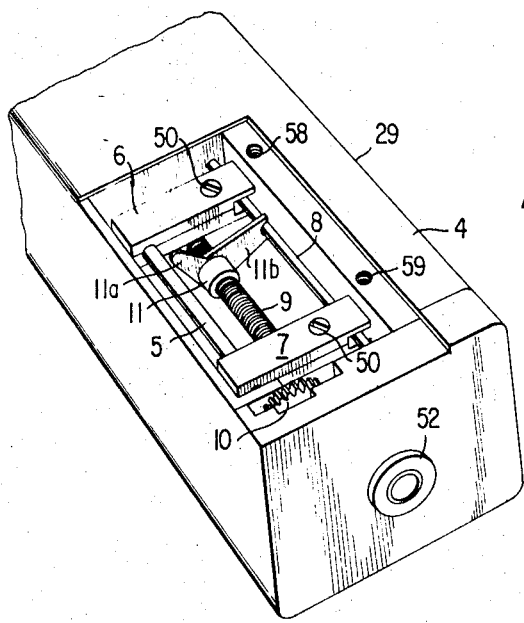
FIG. 7 is a perspective view of the electromotive drive means, including the bottom face of FIG. 1.

FIG. 7 is a perspective view including the view of FIG. 1. The top of the transmission housing 4 is provided with two threaded bores 58 and 59.

Figure 8:
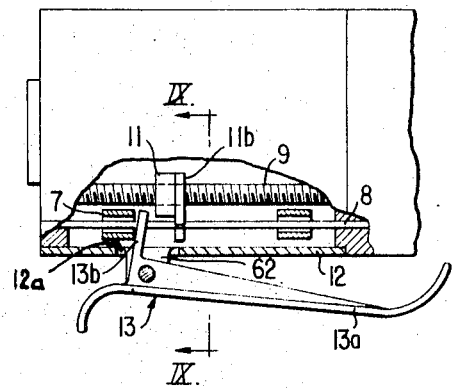
FIG. 8 is a part of FIG. 2 in a different phase of operation and is also a detail view of a part of FIG. 6.
Figure 9:
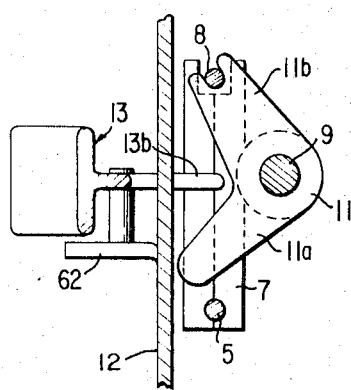
FIG. 9 is a section along the line IX—IX of FIG. 8.

In the embodiment of FIGS. 2, 8 and 9, the depth of the various components into and out of FIGS. 2 and 8 have been adjusted for purposes of illustration. True depth relationships are shown in FIG. 9. In this embodiment, a housing cover 12 is mounted on the transmission housing 4. Mounting has been effected using metal screws 60 and 61 driven into bores 59 and 58. Probing lever or trigger 13 is pivotally connected to lug 62 of cover 12. The showing of the lever 13 in FIG. 2 is simply an enlargement of the lever as it is shown in FIG. 5. A first feeler arm 13a extends obliquely downwards and rests in contact with the uppermost slat 32a. While arm 13a is shown in contact with slat 32a, this is not necessary, it simply being essential that arm 13a extend obliquely downwards and be in the path of movement of the slat stack, of which slat 32a will be the uppermost, when rail 44 is raised. The second arm 13b of the lever extends through a slot 12a of the cover 12 into the interior of the transmission housing.

While the clamp 6 may be adjusted in the factory such that the traveling nut 11 with shoulder 11a will stop lowering of a blind at a sufficiently accurate level, dependence on an accurate factory setting of clamp 7 is in many instances not feasible. Thus, it is desirable that the blind be raised as far as possible, but should the clamp 7 be set just a bit too far to the left in FIG. 2, the rail 44 may jam the stack of slats after having gone as far upwards as is possible, while clamp 7 has not been pushed quite far enough to cut off the motor. This can lead to the burning out of the motor or can necessitate the inclusion of some type of heat-sensing safety device. The present invention, wherein lever 13 may be included by simple attachment of cover 12, alleviates this problem by providing a direct probing of the height to which the blind has been raised and by providing a structure wherein the jamming of the blind in an uppermost position, while the motor is still energized, is impossible.

Arm 13b is in the immediate vicinity of the clamp 7 and enters into positive abutment with this clamp when the other lever arm 13a is lifted upwards. Continued movement of the arm 13a causes arms 13b to displace the clamp 7 and thus the switching bar 5. In FIG. 11, shoulder 54 pushes contact 56 open upon this displacement of clamp 7.

FIG. 8 is a detail view of the lever 13 in the position of FIG. 6. It is shown that arm 13b has moved clamp 7 to the left, where the motor circuit has been opened, while shoulder 11a has not abutted against the clamp. FIG. 9 shows the clearance between arm 13b and nut 11 with its two parts, shoulder 11a and forked lug 11b.

Figure 10:
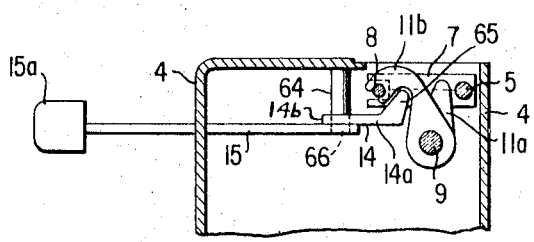
FIG. 10 is a section along the line X—X of FIG. 3.

FIGS. 3 and 10 show another embodiment of the invention. Lever 14 is pivotally mounted at pivot 64 to the wall of the transmission housing 4. Arm 14a thereof has a lug 65 in the plane of the clamp 7, as shown especially in FIG. 10. Arm 14b extends from pivot 64 at right angles to arm 14a. Probe 15 is connected at pivot 66 to the arm 14b and its free end extends through a slot in the transmission housing 4. While this embodiment of the invention is not shown being applied such as has been done for the embodiment of FIG. 2 in FIGS. 5 and 6, it will be readily apparent that it is intended that probe 15 extend downwards in a FIG. 5-type setting until free end 15a rests against an uppermost slat 32a. A forcing of slat 32a upwards by rail 44 causes lever 14 to pivot counterclockwise in FIG. 3, whereby lug 65 is pushed against clamp 7 to open contact 56 of FIG. 11.

In FIG. 4, a factory assembly frame 21 is illustrated below a rope winch 22 with two ropes 23. The two ropes are guided through guides of the frame 21 and carry at their ends an assembly beam 24 against which the drive housing 25 of a Venetian blind is mounted. The turning bar 28 of the blind is provided in the drive housing 25 and carries two reels 26 and 27, this turning bar being coupled with the transmission output 52 of the electromotive drive means 29. Ladder straps 30 and 31 carry the slats 32 of the blind. The slats are inserted into the ladder straps for about 30 cm. of height at a time. The mounting beam 24 is transported upwardly in 30 cm. increments by means of the rope pulleys 23. Subsequently, the assembly operation is continued until the blind is finished to the desired length. Thereupon, the bottom rail 44 is fastened to the ladder straps at exactly the desired length. In this condition, the Venetian blind is exactly in the same position as when it is completely lowered in front of a window.

It should be understood, of course, that the foregoing disclosure relates to only preferred embodiments of the invention and that it is intended to cover all changes, modifications and combinations of the examples of the invention herein chosen for the purposes of the disclosure, which do not constitute departures from the spirit and scope of the invention set forth in the appended claims.

What is claimed is:
1. An electrically powered venetian blind having a reversible motor for driving the blind slats upwardly and downwardly, a limit switch assembly for stopping vertical movement of the slats between upper and lower limits, the assembly comprising first limit switch means connecting a power source to a motor input terminal, the first switch means responding to a preselected number of motor revolutions indicative of extreme slat displacement to a first vertical limit position for terminating further motor operation; and second independent limit switch means connecting the power source to a motor input terminal, the second switch means responding to extreme displacement of the slats to a position indicative of an oppositely disposed second limit position for terminating further motor operation.

2. The structure of claim 1 wherein the first vertical limit position represents the extreme lower limit position of the slats and further wherein the first switch means includes a screw shaft coupled to the motor; a threaded member axially mounted to the shaft and longitudinally displaceable as the shaft rotates; a cam member normally positioned in spaced alignment from the threaded member; a link member attached to the cam member; and switch contacts opened by urging enggagement with the link member when the threaded member displaces the cam member after said preselected number of motor revolutions occur.

3. The structure defined in claim 2 wherein the second vertical limit position represents the extreme upward position of the slats and further wherein the second switch means includes a pivotal trigger arm, contacting an upper slat for detecting upward contraction of the slats to the upper limit position; a second cam member attached to the link member and switch contacts opened by urging engagement with the link member when the arm engages the second cam member.

4. In combination with an electromotive drive system, two limit switch assemblies for controlling opposite limits of movement for a venetian blind or the like, the switch assemblies comprising:
 (a) A trigger actuator limit switch being positioned in operative engagement with the slats of the blind and actuated when the upper end position of the slats is attained; and
 (b) a screw shaft limit switch operatively connected to a motor component of the drive, the screw shaft limit switch being actuated when the lower end position of the slats is attained;
hereby the screw shaft limit switch is adjusted during assembly with the drive system, prior to installation, by determining the actuated position of the screw shaft limit switch when the slats are moved to the lower end position.

5. The structure set forth in claim 4 wherein the trigger actuator limit switch includes a feeler arm which contacts the slats, the arm being adapted to engage a trip cam which is attached to a switch rod, the switch rod likewise attaching a second trip cam associated with the screw shaft limit switch.

References Cited
UNITED STATES PATENTS

| | | | |
|---|---|---|---|
| 551,996 | 12/1895 | Oney | 318—468X |
| 1,601,346 | 9/1926 | Callahan | 318—468UX |
| 2,253,557 | 8/1941 | Collins | 318—466 |
| 2,424,385 | 7/1947 | Cook | 318—266 |

ORIS L. RADER, Primary Examiner

A. G. COLLINS, Assistant Examiner

U.S. Cl. X.R.
318—266, 468